United States Patent
Janbu (10) Patent No.: US 10,317,508 B2
(45) Date of Patent: Jun. 11, 2019

(54) APPARATUS AND METHODS FOR RADIO FREQUENCY RANGING

(71) Applicant: Silicon Laboratories Inc., Austin, TX (US)

(72) Inventor: Øyvind Janbu, Oslo (NO)

(73) Assignee: SILICON LABORATORIES INC., Austin, TX (US)

( * ) Notice: Subject to any disclaimer, the term of this patent is extended or adjusted under 35 U.S.C. 154(b) by 0 days.

(21) Appl. No.: 14/148,253

(22) Filed: Jan. 6, 2014

(65) Prior Publication Data

US 2015/0195725 A1    Jul. 9, 2015

(51) Int. Cl.
*H04B 17/00* (2015.01)
*H04W 24/06* (2009.01)
*G01S 5/02* (2010.01)

(52) U.S. Cl.
CPC ................. *G01S 5/0205* (2013.01)

(58) Field of Classification Search
CPC ........ H04W 4/02; H04W 24/06; H04B 17/00; H04B 17/27
USPC ...................................... 455/456.1
See application file for complete search history.

(56) References Cited

U.S. PATENT DOCUMENTS

| | | | |
|---|---|---|---|
| 6,366,762 B1 * | 4/2002 | Miller et al. | 455/67.16 |
| 6,681,099 B1 * | 1/2004 | Keranen et al. | 455/67.16 |
| 7,203,500 B2 * | 4/2007 | Leeper et al. | 455/456.1 |
| 8,948,063 B2 * | 2/2015 | Aryan | G01S 13/74 370/278 |
| 9,661,603 B2 * | 5/2017 | Aldana | G01S 5/0081 |
| 2005/0058081 A1 * | 3/2005 | Elliott | G01S 13/825 370/252 |
| 2006/0012476 A1 * | 1/2006 | Markhovsky | G01S 13/74 340/539.32 |
| 2007/0184843 A1 * | 8/2007 | Sharp | 455/456.1 |
| 2011/0170463 A1 * | 7/2011 | Aryan et al. | 370/281 |
| 2011/0171973 A1 * | 7/2011 | Beck et al. | 455/456.2 |
| 2013/0044612 A1 * | 2/2013 | Hirsch | 370/252 |
| 2015/0141034 A1 * | 5/2015 | Ekbatani | 455/456.1 |

* cited by examiner

*Primary Examiner* — Blane J Jackson
(74) *Attorney, Agent, or Firm* — Miller, Matthias & Hull LLP (57) ABSTRACT

A radio frequency (RF) device is provided. The RF device includes an antenna interface, a receive circuit configured to extract data from incoming signals, a playback circuit configured to associate a predefined delay with the data, a transmit circuit configured to generate outgoing signals based on the data and the predefined delay, and a control circuit configured to calculate range based in part on the predefined delay and phase differences between incoming signals and outgoing signals.

17 Claims, 5 Drawing Sheets

APPARATUS AND METHODS FOR RADIO FREQUENCY RANGING

TECHNICAL FIELD

The present disclosure relates generally to radio frequency (RF) devices, and more particularly, to systems and methods for determining a range or relative position between a plurality of wireless transceivers.

BACKGROUND

Radio frequency transceivers are commonly used in a variety of different positioning and/or ranging applications. Generally, such RF ranging systems serve to determine the relative positions or distances between different transceivers and/or the position or distance of an object of interest relative to one or more transceivers of a given RF infrastructure. RF systems typically employ predefined sets of radio-wave signals which are communicated between different transceivers, and assessed to determine the difference between the time the original signal was transmitted and the time the signal was later received. As properties of radio-wave signals, such as the propagation speeds thereof through a given medium, are known, the propagation time of the signal can be used to derive the approximate distance between two or more transceivers.

In terms of system performance, the accuracy and the resolution of ranging calculations are of particular concern. To achieve better accuracy, some conventional RF systems employ a series of synchronized clocks so as to more accurately measure the propagation time of the radio signals. Other systems employ greater bandwidth to improve accuracy and resolution. In either implementation, however, a wired infrastructure may typically be used which can add to overall costs and limit the mobility of the RF system. A need therefore exists for more versatile and cost-effective RF solutions.

SUMMARY OF THE DISCLOSURE

In one aspect of the present disclosure, a radio frequency device is provided. The radio frequency device includes an antenna interface, a receive circuit configured to extract data from incoming signals, a playback circuit configured to associate a predefined delay with the data, a transmit circuit configured to generate outgoing signals based on the data and the predefined delay, and a control circuit configured to calculate range based at least partially on the predefined delay and phase differences between incoming and outgoing signals.

In another aspect of the present disclosure, a radio frequency system is provided. The radio frequency system includes at least one transceiver in communication with one or more counterpart transceivers. The transceiver is configured to transmit a first signal to the one or more counterpart transceivers, and receive a second signal from one of the counterpart transceivers. The second signal corresponds to the first signal and has at least a predefined delay associated therewith. The transceiver is further configured to determine a range between the transceiver and one of the counterpart transceivers based at least partially on the predefined delay and a phase difference between the first and second signals.

In yet another aspect of the present disclosure, a method of determining a range between RF transceivers is provided. The method includes transmitting a first signal, receiving a second signal corresponding to the first signal and having at least a predefined delay associated therewith, and determining the range based at least partially on the predefined delay and a phase difference between the first and second signals.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Figure 1:
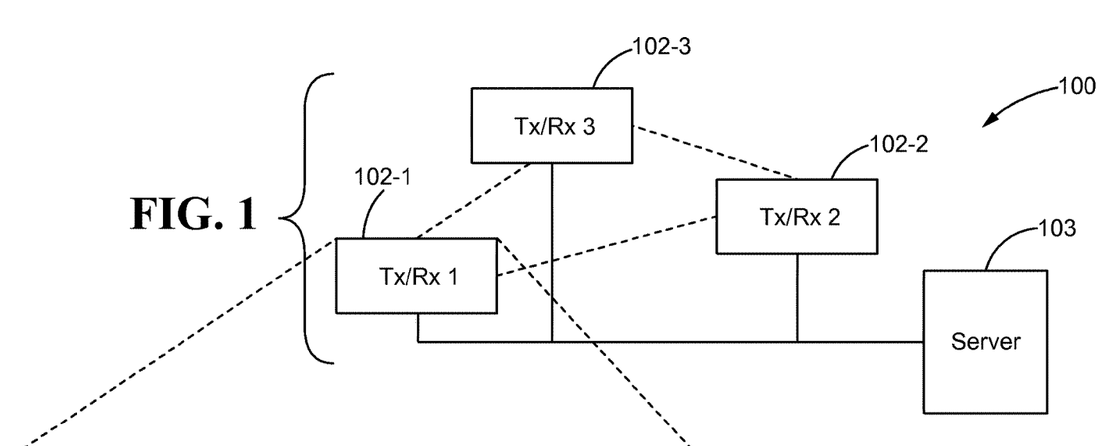
FIG. 1 is a schematic view of one exemplary RF ranging system comprising a plurality of transceivers according to one exemplary embodiment of the present disclosure.

Referring to FIG. 1, one exemplary embodiment of a radio frequency (RF) ranging system 100 is provided having a plurality of RF devices or transceivers 102-1, 102-2, 102-3. Each of the transceivers 102-1, 102-2, 102-3 may be configured to communicate with one another over wireless means, such as radio-wave signals having frequencies ranging approximately between 100 MHz and 100 GHz, or any other suitable frequency range. More specifically, each of the transceivers 102-1, 102-2, 102-3 is configured to transmit radio-wave signals to and/or receive radio-wave signals from one or more counterpart transceivers 102-1, 102-2, 102-3 within the RF system 100. While the embodiment of FIG. 1 is shown to include three transceivers 102, it will be understood that the RF system 100 may include fewer than or more than three transceivers 102 in other embodiments. Additionally or optionally, the RF system 100 can include one or more computing devices 103, such as one or more centralized servers, or the like, configured to communicate with one or more of the transceivers 102 and perform ranging or time-of-flight calculations based on information shared between the transceivers 102. In an embodiment, a computing device 103 employs one or more of microcontrollers, microprocessors, microcomputers, application-specific integrated circuits, field programmable gate arrays, programmable logic circuits, and any other suitable device which operates according to computer-executable instructions, or code, from a non-transitory computer-readable medium such as a nonvolatile memory, a magnetic or optical disc memory, a flash drive, and the like.

The RF system 100 of FIG. 1 is configured to determine or derive a relative range, distance and/or position of an object of interest or of another radio or transceiver device 102-1, 102-2, 102-3. For instance, the transceivers 102-1, 102-2, 102-3 of the RF system 100 are configured to derive a range directly or indirectly based on a time-of-flight of one or more radio signals that are communicated between two or more transceivers 102-1, 102-2, 102-3. In other configurations, the RF system 100 may be configured to enable derivation of a range based on a calculated angle-of-arrival, and/or configured to determine a position of an object of interest in two-dimensional space or in three-dimensional space. In other embodiments, the RF system 100 may be configured to perform multiple iterations per calculation, or multiple measurements from which an average may be calculated to provide better estimates. In still further embodiments, the RF system 100 may be configured to employ combinations of different measurement schemes from which improved estimates may be derived.

Figure 2:
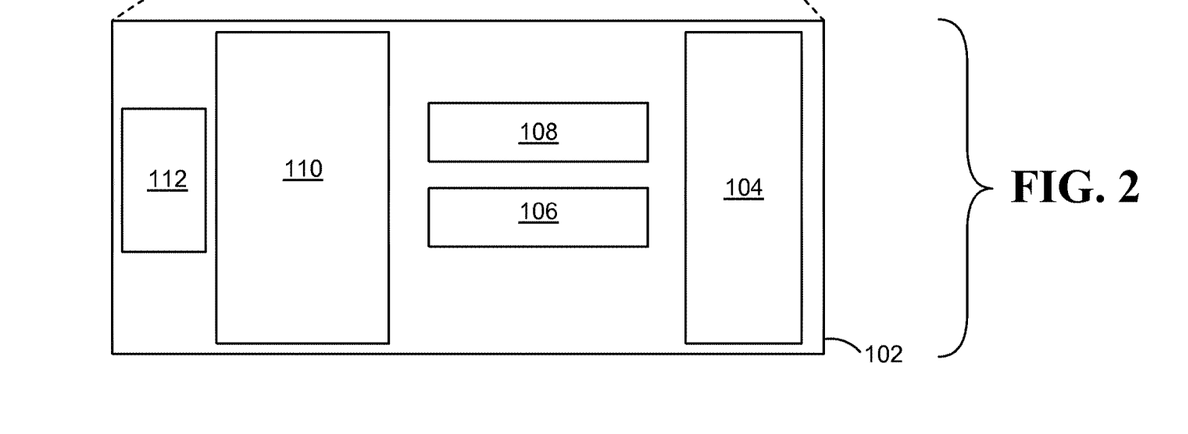
FIG. 2 is a schematic view of one exemplary embodiment of an RF transceiver of the present disclosure.

Turning now to FIG. 2, one general schematic of an RF device or transceiver 102 is provided. As shown, each transceiver 102 includes, among other circuitry, one or more antenna interfaces 104, a receive circuit 106, a transmit circuit 108, a control circuit 110, such as a baseband processor, or the like, and a data storage device 112. In particular, the antenna interface 104 is configured to receive a radio signal transmitted from another counterpart transceiver 102-1, 102-2, 102-3 and/or transmit a radio signal to a counterpart transceiver 102-1, 102-2, 102-3. The receive circuit 106 is in electrical communication with an output of the antenna interface 104 and configured to process one or more analog radio signals that may be communicated by a counterpart transceiver 102-1, 102-2, 102-3 and received by the antenna interface 104. The transmit circuit 108 is in electrical communication with an input of the antenna interface 104 and configured to transmit one or more analog radio signals to one or more counterpart transceivers 102-1, 102-2, 102-3 via the antenna interface 104.

Additionally, the control circuit 110 of the transceiver 102 of FIG. 2 may be disposed in direct or indirect electrical communication with one or more of the antenna interface 104, the receive circuit 106 and the transmit circuit 108, and configured to at least partially manage operations thereof according to one or more preprogrammed sets of instructions, algorithms, coded processes, or the like. As schematically shown, for example, the control circuit 110 indirectly communicates with the antenna interface 104 through each of the receive circuit 106 and the transmit circuit 108. More particularly, the transceiver 102 is configured such that the receive circuit 106 creates a receive path through which the control circuit 110 may receive relevant data from radio signals received at the antenna interface 104, and such that the transmit circuit 108 creates a transmit path through which the control circuit 110 may transmit relevant data through radio signals to be transmitted via the antenna interface 104. Furthermore, the data storage device 112 is used to at least temporarily store data, such as raw data, received through the receive circuit 106, and to be subsequently played back and transmitted through the transmit circuit 108.

Figure 3:
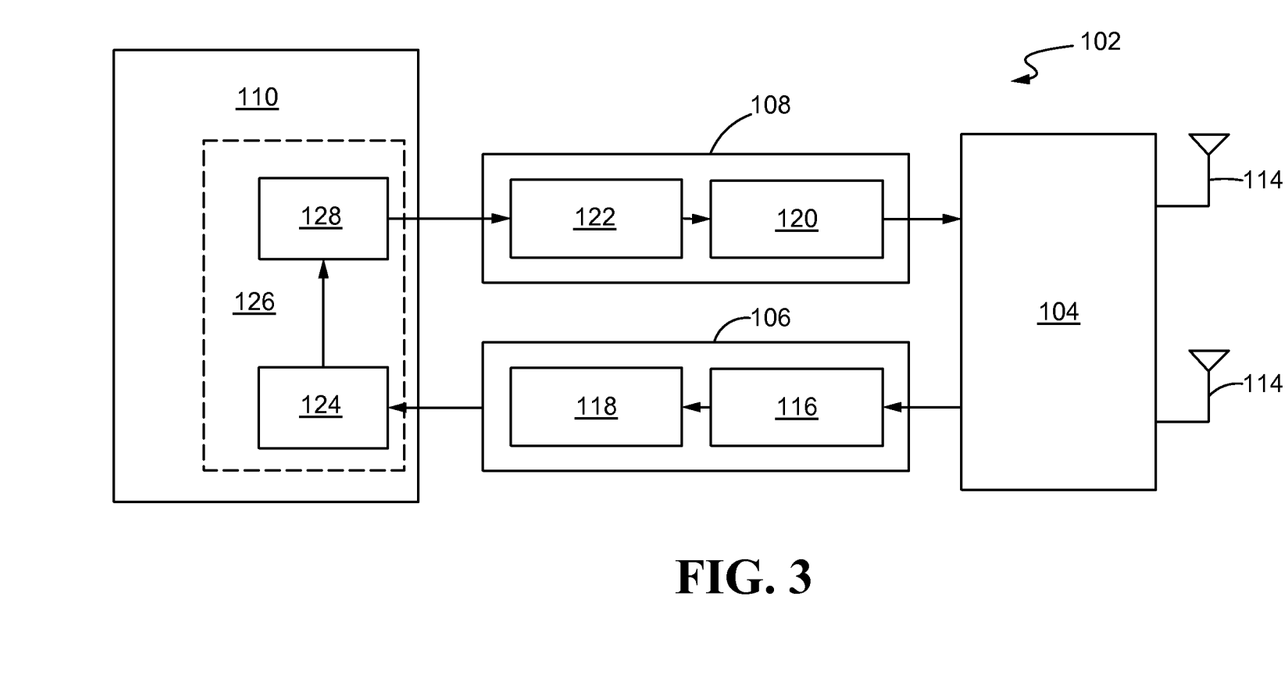
FIG. 3 is a schematic view of another exemplary embodiment of an RF transceiver of the present disclosure.

Turning to FIG. 3, another exemplary embodiment of an RF device or transceiver 102 that may be used in conjunction with the RF system 100 of FIG. 1 is provided in more detail. As shown, the transceiver 102 includes, among other basic circuitry, an antenna interface 104 having one or more antennas 114 wirelessly configured to receive a radio signal transmitted from another counterpart transceiver 102-1, 102-2, 102-3 and/or transmit a radio signal to a counterpart transceiver 102-1, 102-2, 102-3. The transceiver 102 further includes a receive circuit 106 in electrical communication with an output of the antenna interface 104 configured to process a radio signal that may be received by one or more of the antennas 114 of the antenna interface 104. The receive circuit 106 also includes analog circuitry 116 as well as digital circuitry 118 configured to appropriately process incoming analog radio signals into relevant digital data. The receive-side analog circuitry 116 generally includes circuitry for filtering and down-converting an incoming analog signal while the receive-side digital circuitry 118 include circuitry for sampling, demodulating and converting the incoming analog signal into digital data. The transceiver 102-1, 102-2, 102-3 additionally includes a transmit circuit 108 in electrical communication with an input of the antenna interface 104 configured to transmit a radio signal to one or more counterpart transceivers 102-1, 102-2, 102-3 via one or more of the antennas 114 of the antenna interface 104. Correspondingly, the transmit circuit 108 further includes analog circuitry 120 as well as digital circuitry 122 configured to process relevant digital data into appropriate analog radio signals to be wirelessly transmitted. Moreover, the transmit-side digital circuitry 122 includes circuitry for modulating and converting digital data into corresponding analog form to be up-converted, amplified and otherwise processed by the transmit-side analog circuitry 120 for transmission by the antenna interface 104.

Still referring to FIG. 3, the RF transceiver 102 shown further includes a control circuit 110, such as a baseband processor, or the like, that is in direct or indirect electrical communication with one or more of the antenna interface 104, the receive circuit 106 and the transmit circuit 108. More particularly, the control circuit 110 is configured to at least partially manage operations of the transceiver 102 according to one or more preprogrammed sets of instructions, algorithms, coded processes, or the like, retrievably stored in a data storage or memory 124 associated therewith. For example, the control circuit 110 is configured to enable the receive circuit 106 to receive data, enable the transmit circuit 108 to transmit data, as well as enable the receive circuit 106 and the transmit circuit 108 to operate in a loop-back mode so as to determine a local latency of the associated transceiver 102. As schematically shown, the transceiver 102 also provides a playback circuit 126 which may be at least partially implemented by the control circuit 110 and in electrical communication with at least the receive circuit 106 and the transmit circuit 108. The playback circuit 126 is configured to playback information in a manner which provides a predictable latency between the signal received at the antenna input, and the signal later transmitted at the antenna output.

As shown in FIG. 3, the transceiver 102 is implemented such that the receive circuit 106 creates a receive path through which the playback circuit 126 may receive relevant data, such as raw data derived from radio signals received at the antenna interface 104. In response to data received via the receive circuit 106, the transmit circuit 108 creates a transmit path through which the playback circuit 126 may transmit relevant data, such as playback data corresponding to the raw data. As shown, the playback circuit 126 at least partially incorporates the memory 124 associated with the control circuit 110, and further, includes a playback generator 128 with which to generate the playback data. For example, raw data previously extracted by the receive circuit 106 is at least temporarily stored within the memory 124 allocated for the playback circuit 126. The playback circuit 126 then retrieves the raw data from the memory 124 and applies the raw data to the playback generator 128, which may include any one or more of transmit-mixing, frequency-synthesizing, or other digital processes for generating appropriate playback data corresponding to the raw data for transmission via the transmit circuit 108 and the antenna interface 104.

Furthermore, the playback circuit 128 of FIG. 3 is configured such that certain information, such as those used for determining the range, time-of-flight, the angle-of-flight, or any other desired information, is made predictable and preserved between the incoming and outgoing analog radio signals of a given transceiver 102. Moreover, the receive circuit 106 may be configured to extract, filter or otherwise capture digital raw data pertaining to the incoming analog radio signal in a manner configured to reduce any adverse influence by clock drift or frequency offset between two or more transceivers 102. The analog radio signal includes one or more frames of the raw data which may be detected and employed by the receive circuit 106 to retrieve the raw data. For example, a frame of an incoming signal may provide a header portion which signals other transceivers 102 to perform ranging and/or time-of-flight assessments, as well as a content portion which communicates raw data to be played back. The raw data may consist of in-phase and quadrature signals, frequency-demodulated signals, or any other suitable representation of the analog radio signal received at the antenna interface 104.

By storing the raw data in memory 124, and then applying such data to the playback generator 128 after a predefined period of time, information within the raw data can be played back in a manner which provides a known or predictable latency with regards to the transmission thereof between two or more transceivers 102. The transmit circuit 108 may then digitally modulate or otherwise process the playback data and provide an outgoing analog radio signal based on the playback data to be transmitted via the antenna interface 104. Similar to the raw data, the outgoing analog radio signal may include one or more frames of the playback data which may be detected and employed by the receive circuits 106 of counterpart transceivers 102 to retrieve the playback data as raw data. Moreover, by providing a predictable latency associated with the raw data, the corresponding distance or range between two or more transceivers 102 may be assessed, either directly or indirectly via time-of-flight calculations, or the like.

Figure 4:
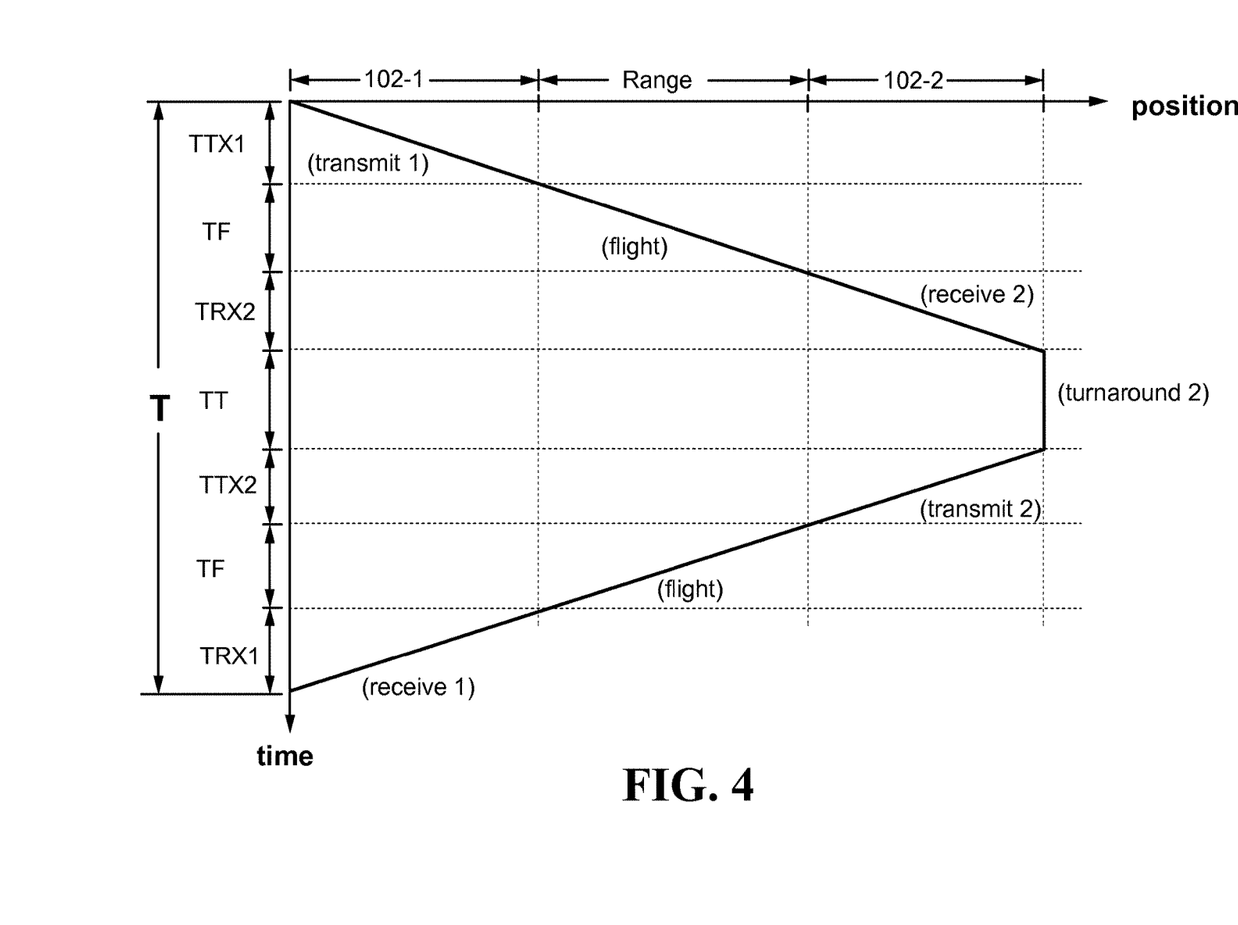
FIG. 4 is a graphical view of one exemplary iteration of radio communications between a first transceiver and a second transceiver within an RF system as a function of distance.

Referring now to FIG. 4, example latencies or delays associated with one iteration of RF ranging using two transceivers 102-1, 102-2 of the RF system 100, not necessarily drawn to scale, are graphically provided with respect to position. As indicated, each transceiver 102-1, 102-2 may experience certain delays associated with receiving a signal, processing the received signal, processing a return signal, transmitting the return signal, and the like. In the example of FIG. 4, TTX1 denotes the transmit delay of the first transceiver 102-1, TRX2 denotes the receive delay of the second transceiver 102-2, TTX2 denotes the transmit delay of the second transceiver 102-2, and TRX1 denotes the receive delay of the first transceiver 102-1. In addition, TF denotes the time-of-flight, or the delay associated with each signal propagation between the first transceiver 102-1 and the second transceiver 102-2, and TT denotes the turnaround delay, or the delay associated with generating playback data based on raw data extracted from the original signal. The transceiver 102 operates in half-duplex mode, in which case, the turnaround delay, or TT, is configured to be at least as long as the duration associated with recording an amount of raw data corresponding to one time-of-flight calculation. The total communication time between the initial transmission of the original signal at the first transceiver 102-1 and the receipt of the return signal at the first transceiver 102-1 is denoted by T.

Still referring to FIG. 4, the receive and transmit delays, TRX and TTX, may vary per transceiver 102-1, 102-2 and per iteration due to several factors. For instance, the respective analog circuitry 116, 120 of the transceivers 102-1, 102-2 can be affected by ambient temperature, operating voltage, and other influences, and therefore, latencies associated therewith may remain unknown. The sum of the receive and transmit delays, TRX+TTX, or the local latency per transceiver 102-1, 102-2, are locally and individually measured by the respective control circuits 110, for example, by operating in a loop-back mode. The turnaround delay, TT, may be user-defined and set via the control circuit 110 to a fixed value. For example, the turnaround delay, TT, is configured to be a fixed value that is at least as long as the duration associated with recording and playing back a given set of raw data such that the delay associated with playback is predictable. In alternative embodiments, the turnaround delay, TT, may be varied according to predefined functions or specifications, for example, to add security to the overall RF system 100 and to prevent unauthorized access, such as unauthorized decoding of data communicated therein. The range or distance between the transceivers 102-1, 102-2 is an unknown value which can be derived directly or indirectly based on the signal propagation speed and the time-of-flight, TF. The signal propagation speed is a known value which may be determined based on the type of radio waves being employed, the medium through which the radio waves are anticipated to propagate, and the like. However, the time-of-flight, TF, is an unknown value which can be derived with further analysis.

In order to determine the range between transceivers 102-1, 102-2 and/or a time-of-flight of a signal therebetween, each of the transceivers 102-1, 102-2 of the RF system 100 is configured to calculate the local latency of each transceiver 102-1, 102-2, and determine a predictable latency in the overall communication of raw data. Specifically, the local latency of each transceiver 102-1, 102-2 is determined by operating the respective receive and transmit circuits 106, 108 in a loop-back mode and measuring the delay associated therewith, or the sum TRX+TTX. The latency associated with the playback of the raw data may be known based on the predefined turnaround delay, or TT. For example, once raw data is received and stored, playback of the raw data is intentionally delayed by the fixed turnaround delay, TT, thereby providing a predictable latency. Based on the sum of the transmit and receive delays, TRX+TTX, for each transceiver 102-1, 102-2 and the predictable turnaround delay, TT, the RF system 100 is configured to derive the time-of-flight, TF, and thus, the corresponding range, distance or relative position between the first transceiver 102-1 and the second transceiver 102-2. Furthermore, any one or more of the transceivers 102-1, 102-2 may be configured to perform the measurements and calculations according to a predetermined set of instructions, algorithms, coded processes, or the like. Moreover, such instructions can be preprogrammed onto the control circuit 110 of one or more of the transceivers within the RF system 100. Still further, part or all of the measurements and calculations may be performed at one or more computing devices 103 associated with the RF system 100, such as one or more centralized servers, or the like.

Figure 5:
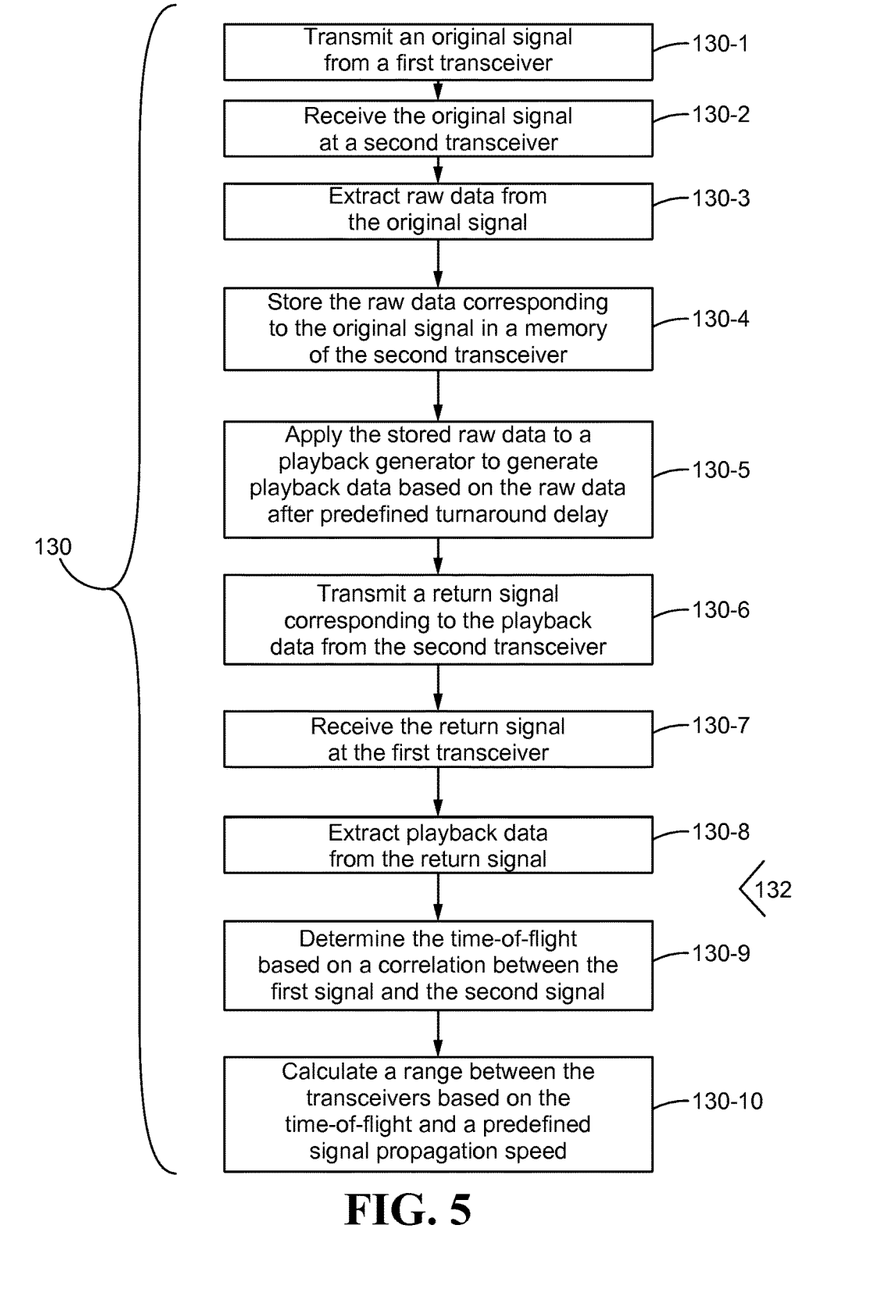
FIG. 5 is a diagrammatic of one exemplary algorithm or method for operating one or more transceivers of an RF system.

Turning to FIG. 5, one such exemplary algorithm or method 130 for operating one or more transceivers 102, or at least one of the control circuits 110 thereof, is diagrammatically provided. For example, one or more of the individual blocks of the method 130 shown are executed by the control circuit 110 of a first transceiver 102-1, the control circuit 110 of a second transceiver 102-2, a computing device 103 associated with the RF system 100, or any combination thereof. As shown in block 130-1, a control circuit 110 associated with the RF system 100 is configured to initially communicate an original signal from the first transceiver 102-1 that is, for example, generated using the analog and digital circuitry 116, 118 of the receive circuit 106 of the first transceiver 102-1 and wirelessly transmitted via one or more antennas 114 of the antenna interface 104 associated therewith. The original signal is transmitted in the form of an analog radio wave signal, such as a radio-wave signal having a frequency ranging approximately between 1 kHz and 100 GHz, or the like, and configured to include one or more frames of raw data using a sequence with high autocorrelation properties sufficient to be detected and retrieved by the analog and digital circuitry 120, 122 of the receive circuit 106 of the second transceiver 102-2, or those of any other counterpart transceiver 102 within the RF system 100. Correspondingly, the control circuit 110 in block 130-2 is configured to receive the original signal via one or more antennas 114 of the antenna interface 104 of the second transceiver 102-2. For example, the receiving portion of the transceiver 102 is normally on and configured to search for a predefined, incoming frame having a synchronization header such that the exact time when such frame is received does not have to be known.

In block 130-3, the control circuit 110 is configured to employ the analog and digital circuitry 120, 122 of the receive circuit 106 at the second transceiver 102-2 to extract the raw data from the original signal, for example, by filtering, sampling, or otherwise processing and converting the analog signal into digital form. Moreover, the receive circuit 106 is configured to detect one or more frames of the raw data and begin extracting data from the raw data corresponding to the original signal provided in oversampled form, such as in-phase and quadrature data, frequency-demodulated data, RF phase data, or the like. For example, the receive circuit 106 detects a header portion of an incoming frame configured to trigger a ranging and/or time-of-flight assessment, and in response to the header portion, begin extracting the raw data from a corresponding content portion of the frame. The control circuit 110 in block 130-4 is configured to at least temporarily and retrievably store the extracted raw data corresponding to the original signal in the memory 124 of the second transceiver 102-2. Optionally, the signal quality of the raw data is evaluated prior to block 130-5, for instance, to avoid retransmission of corrupt or otherwise low-quality data.

In block 130-5, the control circuit 110 is further configured to employ the playback circuit 126 to generate playback data corresponding to the stored raw data. Specifically, the control circuit 110 applies or inputs the raw data to a playback generator 128 including one or more of a transmit mixer, a frequency synthesizer, or the like, that is configured to digitally modulate the raw data and generate playback data based thereon. Furthermore, the control circuit 110 configures the playback circuit 126 and playback generator 128 to generate playback data after a predefined duration or turnaround delay, TT, that is at least as long as the duration associated with recording as well as playing back the raw data so as to induce a predictable latency. Having a fixed turnaround delay, TT, provides a more consistent basis for measuring range, time-of-flight, angle-of-flight, or any other desired information that is not adversely affected by clock drift, frequency offset, or other potential factors.

In block 130-6, the control circuit 110 is configured to transmit a return signal from the second transceiver 102-2 that is generated based on data collected by the analog and digital circuitry 120, 122 of the receive circuit 106 thereof.

Similar to the process of block 130-1 performed at the first transceiver 102-1, the return signal is wirelessly transmitted by one or more antennas 114 of the antenna interface 104 of the second transceiver 102-2 in the form of an analog radio wave signal, such as a radio-wave signal having a frequency ranging approximately between 100 MHz and 100 GHz, or the like. The return signal is also configured to include one or more frames of the playback data using a sequence with high autocorrelation properties sufficient to enable detection and retrieval by the analog and digital circuitry 116, 118 of the receive circuit 106 of the first transceiver 102-1, or those of any other counterpart transceiver 102 within the RF system 100. Correspondingly, the control circuit 110 in block 130-7 is configured to receive the return signal via the antenna interface 104 of the first transceiver 102-1.

Similar to the manner in which the raw data was extracted from the original signal at the second transceiver 102-2, at least one of the control circuits 110 is configured to extract the playback data from the return signal at the first transceiver 102-1 in block 130-8. In particular, the control circuit 110 is configured to employ the analog and digital circuitry 116, 118 of the receive circuit 106 at the first transceiver 102-1 to extract the playback data from the return signal, for example, by filtering, sampling, or otherwise processing and converting the analog signal into digital form. Furthermore, the receive circuit 106 is configured to detect one or more frames of the playback data and begin extracting data from the playback data corresponding to the return signal provided in oversampled form, such as in-phase and quadrature data, frequency-demodulated data, RF phase data, or the like. In block 130-9, the control circuit 110 is configured to determine the phase difference between the original signal initially transmitted by the first transceiver 102-1 and the return signal later transmitted by the second transceiver 102-2 using correlation, for instance, a sequence with high autocorrelation properties. Based on the phase difference as well as the measured and known timing parameters, such as the sum of the receive and transmit delays, TRX+TTX, the turnaround delays, TT, and the like, the control circuit 110 is then able to determine at least the time-of-flight, or the time for the original and return signals to travel between the first and second transceivers 102-1, 102-2. Still further, in block 130-10, the control circuit 110 is configured derive a corresponding range between the first and second transceivers 102-1, 102-2 based on the time-of-flight and the known propagation speed of the radio wave signals.

Figure 6:
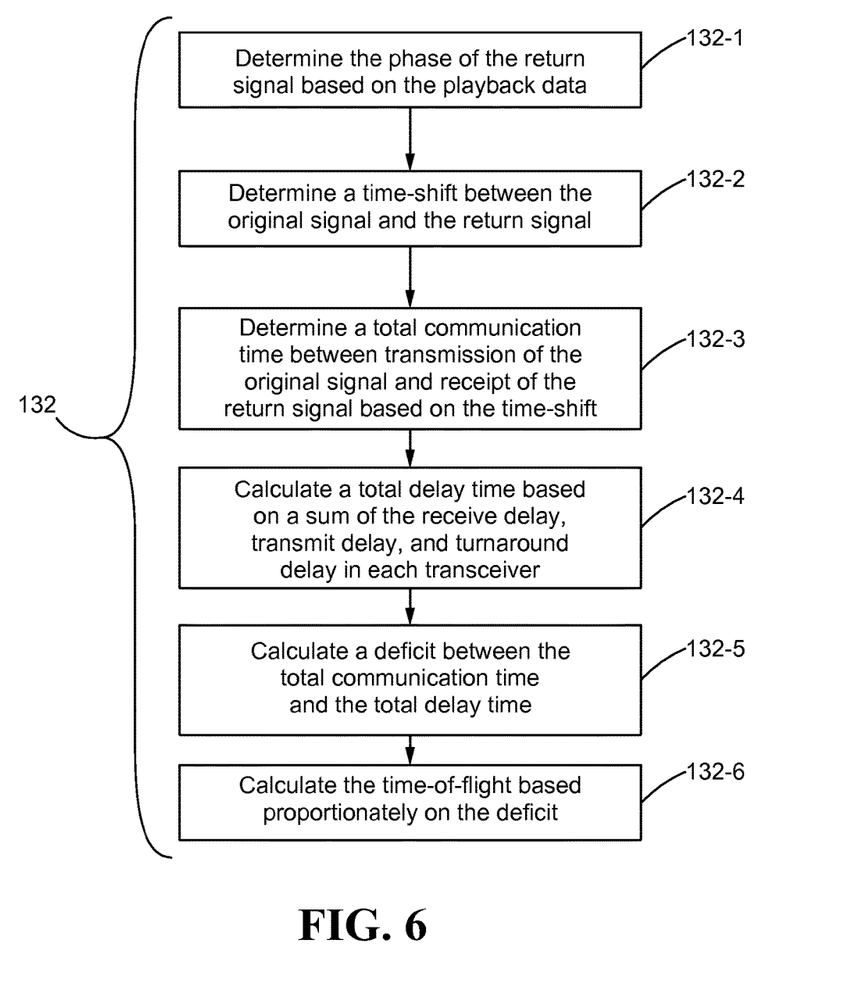
FIG. 6 is an illustrative view of one exemplary algorithm or method for analyzing a phase difference between a first, original signal and a second, return signal.

Referring now to FIG. 6, one exemplary algorithm, sub-algorithm or method 132 by which the RF system 100, or one or more control circuits 110 thereof, can be configured to analyze the time-of-flight and/or range between the first and second transceivers 102-1, 102-2 is diagrammatically provided. More specifically, once the playback data has been extracted from the return signal as shown in block 130-8 of FIG. 5, the control circuit 110 is configured to determine a phase of the return signal based on the playback data in block 132-1. The phase of the return signal can be determined, for example, using a sequence with sufficient autocorrelation properties for the frames transmitted in association with the original signal. Furthermore, as in block 132-2, the control circuit 110 is configured to calculate a time-shift between the original signal and the return signal and the various time-shifted versions of the frames of the original signal. Based on the changes in phase or time-shift determined in blocks 132-1 and 132-2, the control circuit 110 calculates a total communication time, T, or the total time elapsed between the initial transmission of the original signal by the first transceiver 102-1 and the receipt of the return signal at the first transceiver 102-1 in block 132-3.

In block 132-4, at least one of the control circuits 110 of the RF system 100 calculates a total delay time based on a sum of the receive and transmit delays in the first transceiver 102-1, or TRX1+TTX1, the receive and transmit delays in the second transceiver 102-2, or TRX2+TTX2, and the turnaround delay at the second transceiver 102-2, or TT. The sum of the receive and transmit delays, TRX+TTX, per transceiver 102-1, 102-2, is locally measured by the respective control circuit 110, and the turnaround delay, TT, is dependent on the digital clock internal to the respective transceiver 102 as well as the time associated with recording and playing back the raw data. In addition, in block 132-5, the control circuit 110 is configured to calculate a deficit between the total communication time, T, and the total delay time, TRX1+TTX1+TRX2+TTX2+TT. Furthermore, based on the appropriate ratio or proportion of the deficit, the control circuit 110 is configured to determine the time-of-flight of the original signal and/or the return signal, or TF. For example, the control circuits 110 calculates the time-of-flight, TF, as approximately one-half of the deficit calculated between the total communication time and the total delay time. Still further, the time-of-flight, TF, is multiplied by the known and predefined signal propagation speed to determine the distance, relative position or range between the first transceiver 102-1 and the second transceiver 102-2 of the RF system 100, for example, with approximately 1 meter accuracy or less.

As shown, the RF system 100 is capable of determining range information as well as the time-of-flight between the transceivers 102 with relatively few assessments or calculations. Moreover, by enabling operation of each transceiver 102 in such loop-back modes of operation and facilitating calculation of local latencies, the RF system 100 is able to bypass the need for any additional considerations for delays or latencies associated with the analog circuitries 116, 120 which may vary according to temperature and operating voltage. Furthermore, by urging a fixed or otherwise predictable latency between the transmission of the original and return signals, calculations by the RF system 100 are substantially unaffected by any offsets between the internal clocks of the transceivers 102. In alternative embodiments, the RF system 100 may be configured to perform multiple measurements per iteration so as to provide more accurate ranging or time-of-flight estimations, for example, by averaging or by other means. In other alternatives, the RF system 100 may be configured to employ more than two transceivers 102 per iteration to provide more accurate estimations for a given dimension, and/or to provide better ranging in multiple dimensions. In other embodiments, the RF system 100 may employ one or more computing devices 103 to perform all or part of the calculations and measurements in determining ranging or time-of-flight information. In still further embodiments, the RF system 100 may implement a turnaround delay that is varied per iteration according to a user-defined routine or sub-routine so as to secure communications within the RF system 100.

From the foregoing, it will be appreciated that while exemplary embodiments have been set forth for the purposes of illustration, alternatives will be apparent from the above description to those skilled in the art. These and other alternatives are considered equivalents and within the spirit and scope of this disclosure and the appended claims.

What is claimed is:

1. A radio frequency device, comprising:
   an antenna interface;
   a playback circuit;
   a transmit circuit configured to communicate an outgoing signal to a counterpart radio frequency device;
   a receive circuit configured to receive an incoming signal corresponding to the outgoing signal from the counterpart radio frequency device and having at least digitally modulated data and a turnaround delay generated based on the digitally modulated data; and
   a control circuit configured to calculate range based at least partially on the turnaround delay and phase differences between the incoming signal and the outgoing signal.

2. The radio frequency device of claim 1, wherein the antenna interface is configured to receive incoming analog radio signals and transmit outgoing analog radio signals, each including at least one frame of the digitally modulated data.

3. The radio frequency device of claim 1, wherein the control circuit is configured to calculate time-of-flight of the incoming signal received from the counterpart radio frequency device and the outgoing signal communicated to the counterpart radio frequency device, and calculate range based on the time-of-flight.

4. The radio frequency device of claim 3, wherein the control circuit is configured to calculate time-of-flight based on total communication times and total delay times.

5. A radio frequency system, comprising:
   at least one transceiver in communication with one or more counterpart transceivers, the at least one transceiver being configured to:
   transmit a first signal to the one or more counterpart transceivers,
   receive a second signal from the one or more counterpart transceivers, the second signal corresponding to the first signal and having at least digitally modulated data and a turnaround delay generated based on the digitally modulated data, and
   determine a range between the at least one transceiver and the one or more counterpart transceivers based at least partially on the turnaround delay and a phase difference between the first signal and the second signal.

6. The radio frequency system of claim 5, further comprising a computing device in communication with the at least one transceiver configured to calculate a time-of-flight of the first signal and the second signal, and calculate the range based on the time-of-flight.

7. The radio frequency system of claim 5, wherein the turnaround delay has a duration that is at least as long as a duration of time associated with recording data extracted from the first signal and playing back the extracted data at the one or more counterpart transceivers.

8. The radio frequency system of claim 5, wherein the second signal includes data generated by applying data extracted and recorded from the first signal to one of a transmit mixer and a frequency synthesizer of the one or more counterpart transceivers.

9. The radio frequency system of claim 5, wherein the at least one transceiver is configured to transmit the first signal and receive the second signal as analog radio signals each including at least one frame of data.

10. The radio frequency system of claim 5, wherein the at least one transceiver is further configured to calculate a time-of-flight of the first signal and the second signal, and calculate the range based on the time-of-flight.

11. The radio frequency system of claim 10, wherein the at least one transceiver is configured to measure a total communication time between transmission of the first signal and receipt of the second signal.

12. The radio frequency system of claim 11, wherein the at least one transceiver is configured to calculate a total delay time based on receive delays, transmit delays, and the turnaround delay in the at least one transceiver and each of the one or more counterpart transceivers.

13. A method of determining a range between radio frequency transceivers, comprising:
   transmitting a first signal;
   receiving a second signal corresponding to the first signal and having at least digitally modulated data and a turnaround delay generated based on the digitally modulated data; and
   determining the range based at least partially on the turnaround delay and a phase difference between the first signal and the second signal.

14. The method of claim 13, wherein the turnaround delay has a duration that is at least as long as a duration of time associated with recording data extracted from the first signal and playing back the extracted data.

15. The method of claim 13, wherein the second signal includes data generated by applying data extracted and recorded from the first signal to one of a transmit mixer and a frequency synthesizer.

16. The method of claim 13, wherein each of the first signal and the second signal is an analog radio signal including at least one frame of data.

17. The method of claim 13, further comprising:
   determining a total communication time between transmission of the first signal and receipt of the second signal;
   determining a total delay time based on receive delays, transmit delays, and the turnaround delay in each of the radio frequency transceivers;
   determining a time-of-flight based on a difference between the total communication time and the total delay time; and
   determining the range based on the time-of-flight.

* * * * *